United States Patent
Aoki (10) Patent No.: US 6,846,258 B2
(45) Date of Patent: Jan. 25, 2005

(54) GAS TURBINE POWER GENERATION FACILITY

(75) Inventor: Yoshiaki Aoki, Iruma (JP)

(73) Assignee: Ishikawajima-Harima Heavy Industries, Co. Ltd., Tokyo (JP)

( * ) Notice: Subject to any disclaimer, the term of this patent is extended or adjusted under 35 U.S.C. 154(b) by 0 days.

(21) Appl. No.: 10/240,423

(22) PCT Filed: Apr. 19, 2002

(86) PCT No.: PCT/JP02/03922

§ 371 (c)(1), (2), (4) Date: Sep. 30, 2002

(87) PCT Pub. No.: WO02/090742

PCT Pub. Date: Nov. 14, 2002

(65) Prior Publication Data

US 2003/0176223 A1 Sep. 18, 2003

(51) Int. Cl.⁷ ............................................. F16H 47/08
(52) U.S. Cl. ..................... 475/59; 475/346; 475/347; 475/348; 192/55.1; 192/55.6; 192/207; 290/40 A; 464/100; 74/412 R; 74/414; 74/415; 74/421 A; 74/421 R
(58) Field of Search ........................ 475/59, 346, 347, 475/348; 192/55.1, 55.6, 207; 290/40 A; 464/100; 74/412 R, 414, 415, 421 R, 421 A (56) References Cited

U.S. PATENT DOCUMENTS 1,870,076 A * 8/1932 Thomson ..................... 318/13
3,861,484 A * 1/1975 Joslin ......................... 180/65.2
4,077,236 A * 3/1978 Dalziel ......................... 464/61
4,295,348 A * 10/1981 Helfer et al. .................. 464/82
4,759,229 A * 7/1988 Takahashi et al. ............. 74/409
4,876,849 A * 10/1989 Klingels ........................ 60/792
6,176,785 B1 * 1/2001 Geislinger ................. 464/100
6,309,154 B1 * 10/2001 Higgins ........................ 411/7
2003/0115877 A1 * 6/2003 Bara et al. .................... 60/620

FOREIGN PATENT DOCUMENTS

| EP | 000502217 A1 | * | 9/1992 | ............. F16D/3/04 |
| JP | 60157516 A | * | 8/1985 | ............. F16D/3/50 |
| JP | 2000186576 A | * | 7/2000 | ............. F02C/7/36 |
| JP | 2002115726 A | * | 4/2002 | ............. F16D/3/66 |

* cited by examiner

Primary Examiner—Rodney H. Bonck
Assistant Examiner—David D. Le
(74) Attorney, Agent, or Firm—Griffin & Szipl, P.C.

(57) ABSTRACT

There is provided a planetary reduction gear 10 between a gas turbine 1 and a generator 5. The planetary reduction gear includes elastic deformation unit 12 on an output side, and for the elastic deformation unit, a strain energy within an elastic limit is set to be larger than a fluctuation torque energy of the generator of a momentary voltage drop time. The elastic deformation unit 12 includes an elastic member which elastically connects an output shaft 10a of the planetary reduction gear to an outer ring 10b. Thereby, when an excessive torque is generated in the generator by a momentary voltage drop, service interruption, and the like for a short time, it is possible to maintain the operation of a power generation facility, and secure a power supply of an important load, and an installation length is shortened and the facility can be downsized.

8 Claims, 6 Drawing Sheets

Fig.8B  Present invention

GAS TURBINE POWER GENERATION FACILITY

This application is a 371 of PCT/JP02/03922 filed Apr. 19, 2002.

BACKGROUND OF THE INVENTION

1. Technical Field of the Invention

The present invention relates to a gas turbine power generation facility for maintaining an operation of the power generation facility, and securing a power supply of an important load, when an excessive torque is generated in a generator because of a momentary voltage drop or service interruption of a commercial power supply system.

2. Description of the Related Art

With an accident caused by a thunderstorm, and the like in a commercial power supply system, a phenomenon occurs that a voltage of a power line momentarily and remarkably drops. This voltage drop is referred to as a "momentary voltage drop". In this case, in order to minimize a damage of a power generation facility and secure a power supply of an important load of a factory, an apparatus for detecting the accident at a high speed and disconnecting the commercial power supply system is disposed in some case. However, even when the apparatus is disposed, but when a parallel off speed is sufficiently fast, the voltage of a power receiving end momentarily and remarkably drops.

A continuation time of the momentary voltage drop is usually about one second or less, and a frequency largely differs with districts. However, even with the momentary voltage drop having a low frequency, an industry (e.g., semiconductor industry) having a factory where a voltage change is not permitted under a demand of a high-voltage power reception is sometimes seriously influenced. Therefore, in the industry, there has been a strong demand for a power generation facility in addition to the commercial power supply, and for the power supply of the important load of the factory steadily secured even during the momentary voltage drop.

Figure 1:
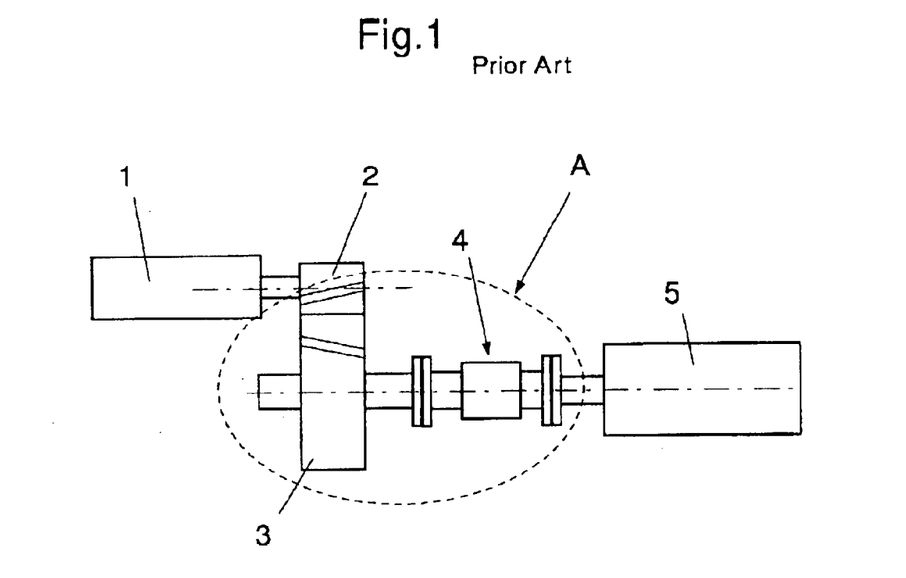
FIG. 1 is a schematic diagram of a conventional gas turbine power generation facility.

FIG. 1 is a schematic diagram of a gas turbine power generation facility which has heretofore been used as a power supply facility. In FIG. 1, reference numeral 1 denotes a motor such as a gas turbine, 2 denotes a pinion gear, 3 denotes a wheel gear, 4 denotes a shaft coupling, and 5 denotes a generator. The motor 1 rotates/drives the pinion gear 2, meshes with the wheel gear 3 to reduce a speed, and rotates/drives the generator 5 via the shaft coupling 4 to generate a power.

Figure 2:
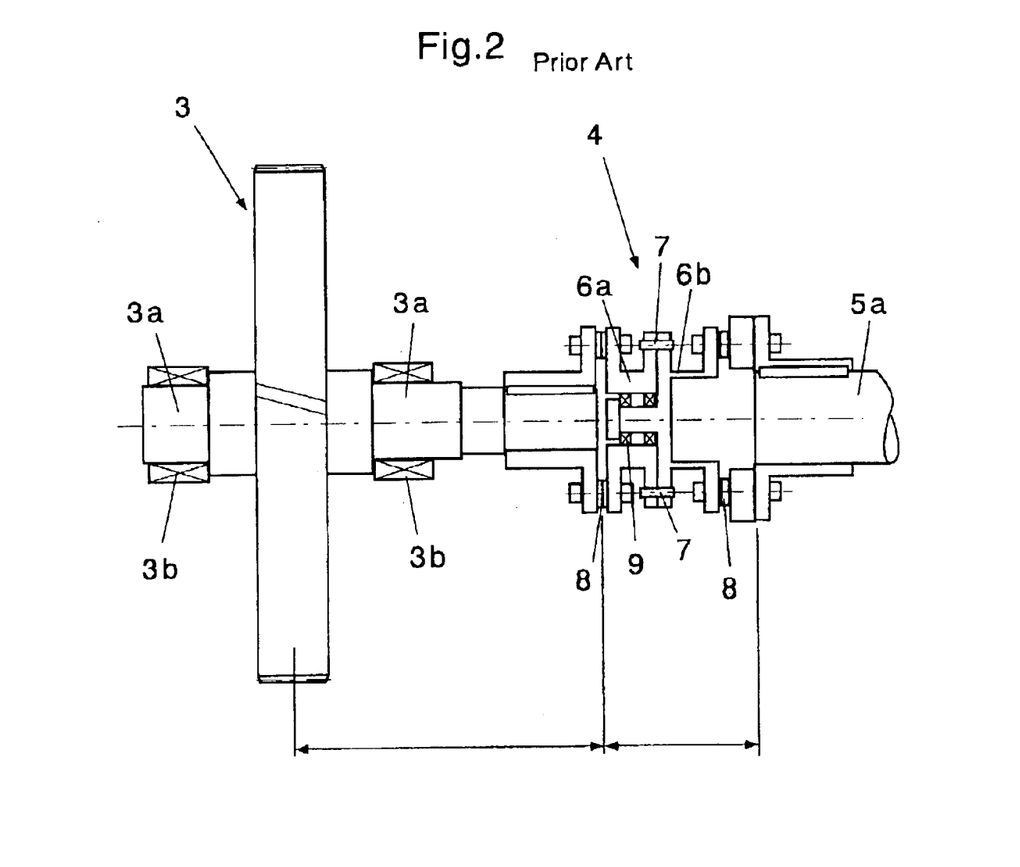
FIG. 2 is an enlarged view of a part A of FIG. 1.

FIG. 2 is an enlarged view of a part A of FIG. 1. As shown in the drawing, the conventional wheel gear 3 is constituted by supporting a center shaft 3a with bearings 3b of opposite ends, and the shaft coupling 4 includes intermediate members 6a, 6b, shear pin 7 for connecting the members, deflection element 8, and the like. The center shaft 3a of the wheel gear 3 is connected to a drive shaft 5a of the generator 5 via the deflection element 8 and a slight deviation of a shaft center is permitted. When a torque not less than an allowable torque acts, the shear pin 7 is constituted to cut and an excessive torque is prevented from acting on the motor 1. Furthermore, in this example, the intermediate members 6a, 6b are supported by a bearing 9, rotations of the center shaft 3a and drive shaft 5a are supported after cutting the shear pin 7, and each shaft is prevented from being damaged.

However, in the above-described gas turbine power generation facility, the power generation facility operates in parallel to the system. When the momentary voltage drop is generated in the system, an excessive electric torque is generated in the generator 5. This causes a problem that the shear pin 7 disposed to protect the motor is damaged. That is, the motor has a torsional strength of an axle necessary for transmitting a maximum output thereof, and momentarily allows the transmission of a torque which is several times as large as a rated torque. However, a short circuit accident of the generator, momentary voltage drop and service interruption on a system side, and the like generate the excessive electric torque in the generator. When a transient response torque exceeds the allowable torque of the motor, the shear pin between the motor shaft and the generator shaft breaks, and there is a problem of much recovery time. Moreover, there is a problem that the shear pin disadvantageously breaks by an accumulated metal fatigue even with a relatively small momentary voltage drop (10 to 30%).

SUMMARY OF THE INVENTION

The present invention has been developed to solve the above-described problem. That is, an object of the present invention is to provide a gas turbine power generation facility which maintains an operation of the power generation facility and can secure a power supply of an important load during generation of an excessive torque in a generator by a momentary voltage drop, service interruption, and the like for a short time. Moreover, another object of the present invention is to provide a gas turbine power generation facility which can be downsized by shortening an installation length. Still another object is to provide a gas turbine power generation facility which can be recovered in a short time without damaging each shaft even with a torque exceeding an allowable torque of a transmission shaft. Still further object is to provide a gas turbine power generation facility whose operation is not stopped even with repeated generation of a relatively small momentary voltage drop.

For a fluctuation of an electric torque during the generation of the momentary voltage drop in a system, a momentary maximum generated torque sometimes reaches about six times a usual torque, a continuation time is remarkably short, the torque vertically fluctuates centering on an average torque in a period of 16 to 20 msec, and the usual torque is sometimes recovered in one or less second. Therefore, in order to prevent motors such as a gas turbine from being damaged by the momentary maximum generated torque, and maintain the operation of the power generation facility, the excessive electric torque of the generator needs to be attenuated before transmitted to the motor. That is, a fluctuating torque energy of a short time may be absorbed by a certain mechanism. The present invention is based on an inventive finding and idea.

That is, according to the present invention, a gas turbine power generation facility which rotates/drives a generator (5) with a gas turbine (1), comprising: a planetary reduction gear (10) between the gas turbine and the generator, the planetary reduction gear including elastic deformation means (12) on an output side, the elastic deformation means having a strain energy within an elastic limit, which is set to be larger than a fluctuation torque energy of the generator of a momentary voltage drop time.

According to the constitution of the present invention, since the strain energy of the elastic deformation means (12) within the elastic limit is set to be larger than the fluctuation torque energy of the generator of the momentary voltage drop time, the momentary maximum generated torque of a short time elastically holds the strain energy therein, and discharges the energy during the generation of a torque of an opposite direction in a period of 16 to 20 msec. Therefore, the operation of the power generation facility can be maintained without transmitting an excessive torque to the gas turbine.

According to a preferred embodiment of the present invention, the elastic deformation means (12) includes an elastic member for elastically connecting an output shaft (10a) of the planetary reduction gear to an outer ring (10b) thereof. Moreover, the elastic member includes a plurality of leaf springs (14) whose inner ends (14a) are fixed to the output shaft (10a) of the planetary reduction gear, and whose outer ends (14b) are connected to the outer ring (10b) of the planetary reduction gear. Furthermore, preferably, the leaf springs (14) are formed in beams whose bend stresses are substantially equal along lengths thereof and which have an equal strength.

According to the constitution, the plurality of leaf springs (14) elastically connect the output shaft (10a) of the planetary reduction gear to the outer ring (10b) thereof in a cantilever state. Therefore, when the momentary voltage drop is generated, an excessive transmission torque can be absorbed by deflection of the leaf springs, and the torque transmitted to the gas turbine (1) can remarkably be reduced.

Furthermore, it is preferable to dispose a hydraulic torque limiter (16) between the output shaft (10a) and the generator (5). The hydraulic torque limiter may be of a type such that a pressure oil is held between the inner ring and outer ring, the pressure oil is discharged during application of a transient response torque not less than a set torque and the inner and outer rings freely rotate with respect to each other. This can prevent a shear pin from being cut by an accumulated metal fatigue and accordingly prevent the power generation facility from stopping.

Other objects and advantageous characteristics of the present invention will be apparent from the following description with reference to the accompanying drawings.

DESCRIPTION OF THE PREFERRED EMBODIMENT

A preferred embodiment of the present invention will be described hereinafter with reference to the drawings. Additionally, common components in the respective drawings are denoted with the same reference numerals.

Figure 3:
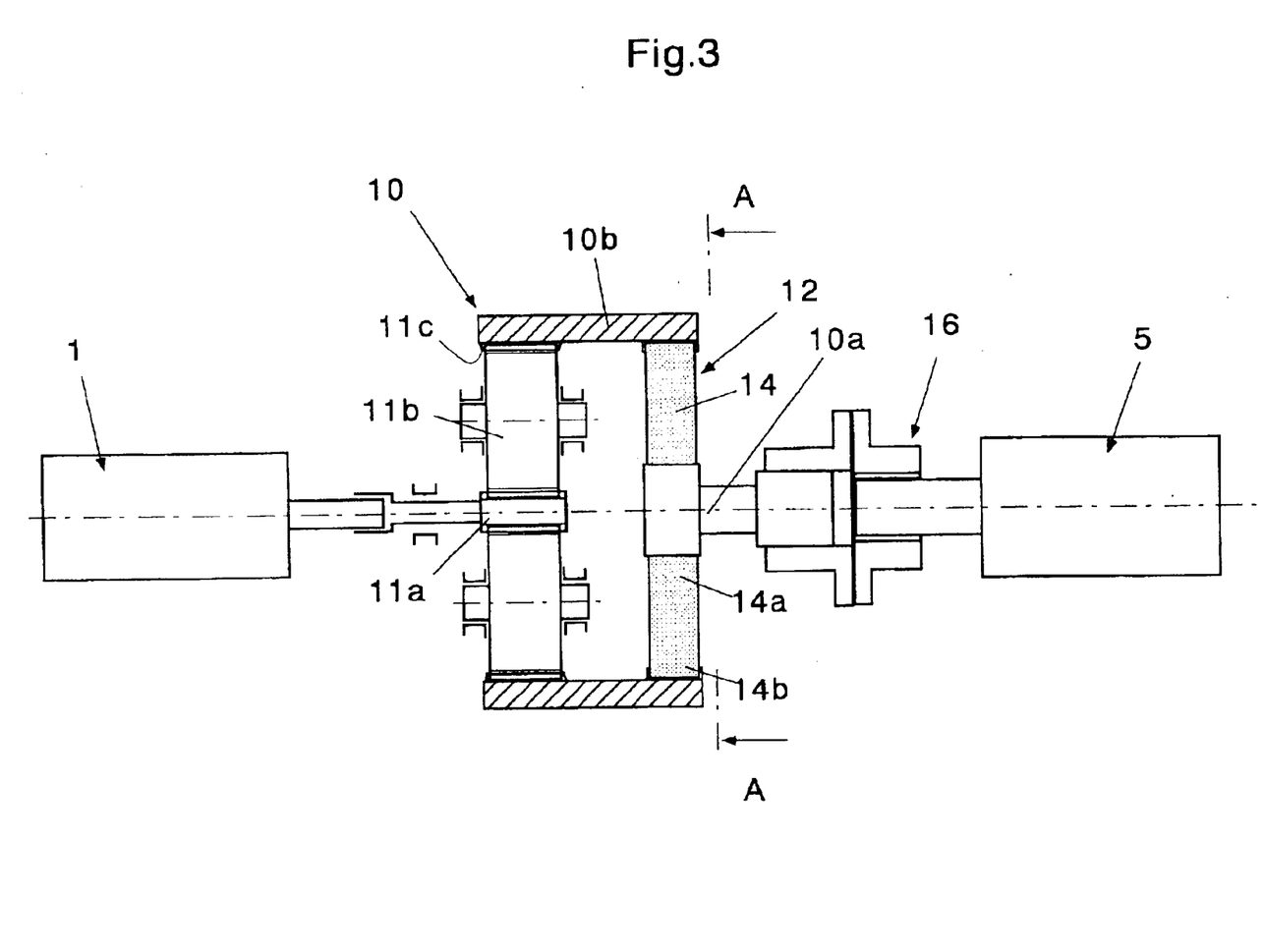
FIG. 3 is an entire constitution diagram of a gas turbine power generation facility according to the present invention.

FIG. 3 is an entire constitution diagram of a gas turbine power generation facility according to the present invention. In the drawing, the gas turbine power generation facility of the present invention is a gas turbine power generation facility which rotates/drives a generator 5 by a gas turbine 1, and includes a planetary reduction gear 10 between the gas turbine 1 and the generator 5.

The planetary reduction gear 10 includes a center sun gear 11a, a plurality of planetary gears 11b which mesh with the sun gear 11a and an inner gear 11c which meshes with the planetary gears 11b. The plurality of planetary gears 11b are rotatably attached to a fixed carrier (not shown). Moreover, the inner gear 11c is integrally molded with the inner surface of the outer ring 10b.

According to the constitution, a high-speed rotation of the sun gear 11a is decelerated and transmitted to the outer ring 10b via the planetary gears 11b and inner gear 11c. The planetary reduction gear 10 is compact and obtains a high reduction ratio as compared with conventional reduction means shown in FIG. 1.

In the present invention, the planetary reduction gear 10 includes elastic deformation means 12 on an output side thereof. The elastic deformation means 12 includes an elastic member for elastically connecting an output shaft 10a of the planetary reduction gear 10 to an outer ring 10b, and a strain energy within an elastic limit is set to be larger than a fluctuation torque energy of the generator of a momentary voltage drop time.

Figure 4:
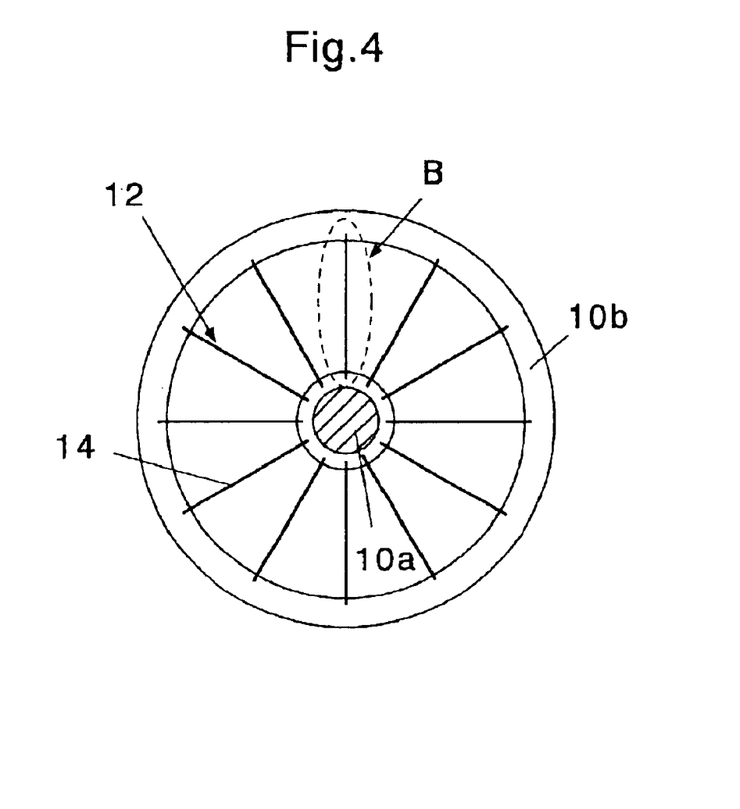
FIG. 4 is a diagram viewed from arrows A—A of FIG. 3.
Figure 5:
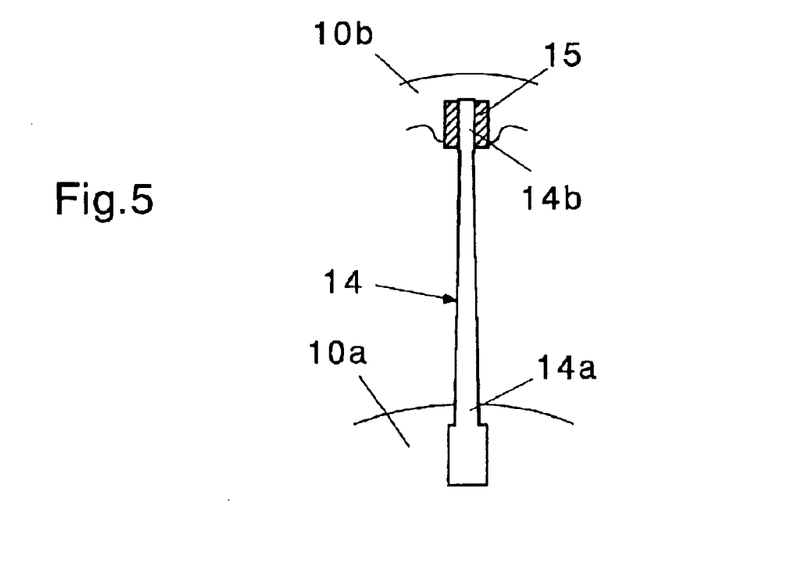
FIG. 5 is a detailed view of a part B of FIG. 4.

FIG. 4 is a diagram viewed from arrows A—A of FIG. 3, and FIG. 5 is a detailed view of a part B of FIG. 4. As shown in FIGS. 4 and 5, the elastic member constituting the elastic deformation means 12 includes a plurality of leaf springs 14 in this example.

As shown in FIG. 5, an inner end 14a of each of the plurality of leaf springs 14 is fixed to the output shaft 10a of the planetary reduction gear 10. Moreover, an outer end 14b of each leaf spring 14 is connected to the outer ring 10b of the planetary reduction gear 10 via an elastic member 15 (e.g., elastic rubber) in this example. According to the constitution, since the outer end 14b of the leaf spring 14 can slide in a length direction, and is connected in a peripheral direction, the leaf spring 14 functions as a cantilever whose inner end 14a is fixed. That is, since the plurality of leaf springs 14 elastically connect the output shaft 10a of the planetary reduction gear to the outer ring 10b in the cantilever state, an excessive transmission torque in the generation of a momentary voltage drop can be absorbed by deflection of the leaf spring, and the torque transmitted to the gas turbine 1 can remarkably be reduced.

Furthermore, the leaf springs 14 are formed in beams which have substantially the equal bend stress along a length and have an equal strength. That is, as shown in FIG. 5, in this example, for a thickness of the leaf spring 14, an inner-end side is constituted to be thick, and an outer-end side is thin.

Figure 6:
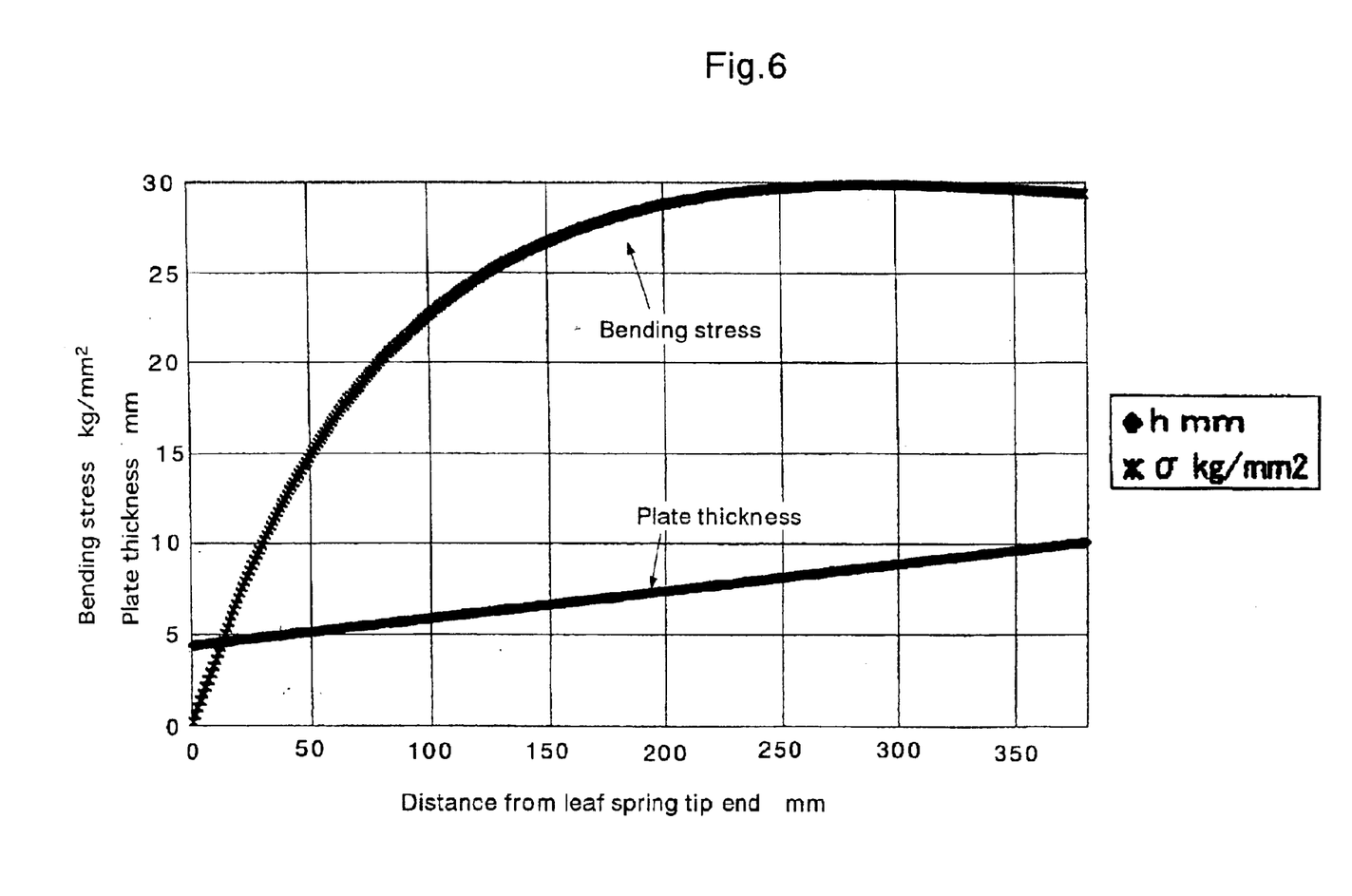
FIG. 6 shows calculation results of a bend stress of a leaf spring of the present invention.

FIG. 6 shows calculation results of the bend stresses of the leaf springs according to a conventional example and the present invention. In this drawing, in the gas turbine power generation facility constituted as described above as one example, assuming that a generator end output is 6450 KW, generator efficiency is 96.5%, and generator rotation number is 1500 rpm ($min^{-1}$), a transmission torque T is about 42500 N·m. The calculation results in a case the number of leaf springs is set to 30 in order to transmit the torque are shown. this drawing, it has been confirmed that a plate width is set to be constant (about 200 mm in this example), a plate thickness is changed as shown in the drawings, thereby a maximum stress can be suppressed to 30 $kgf/mm^2$ (about 294 MPa) or less, and a torsion spring constant of the elastic deformation means 12 can be reduced to about 1600 kgf·m/deg (about 15680 N·m/deg).

Additionally, the shape of the leaf spring of the present invention is not limited to that of the above-described example, and so-called beam having the equal strength may also be formed by changing the width and thickness of the leaf spring.

In FIG. 3, in the gas turbine power generation facility of the present invention, a hydraulic torque limiter 16 is further disposed between the output shaft 10a of the planetary reduction gear 10 and the generator 5. The hydraulic torque limiter may be of a type such that a pressure oil is preferably held between the inner ring and outer ring so as not to be influenced by an accumulated metal fatigue, the pressure oil is discharged during application of a transient response torque not less than a set torque and the inner and outer rings freely rotate with respect to each other.

[Embodiment 1]

An embodiment of the present invention described above will be described hereinafter based on a simulation result.

Figure 7:
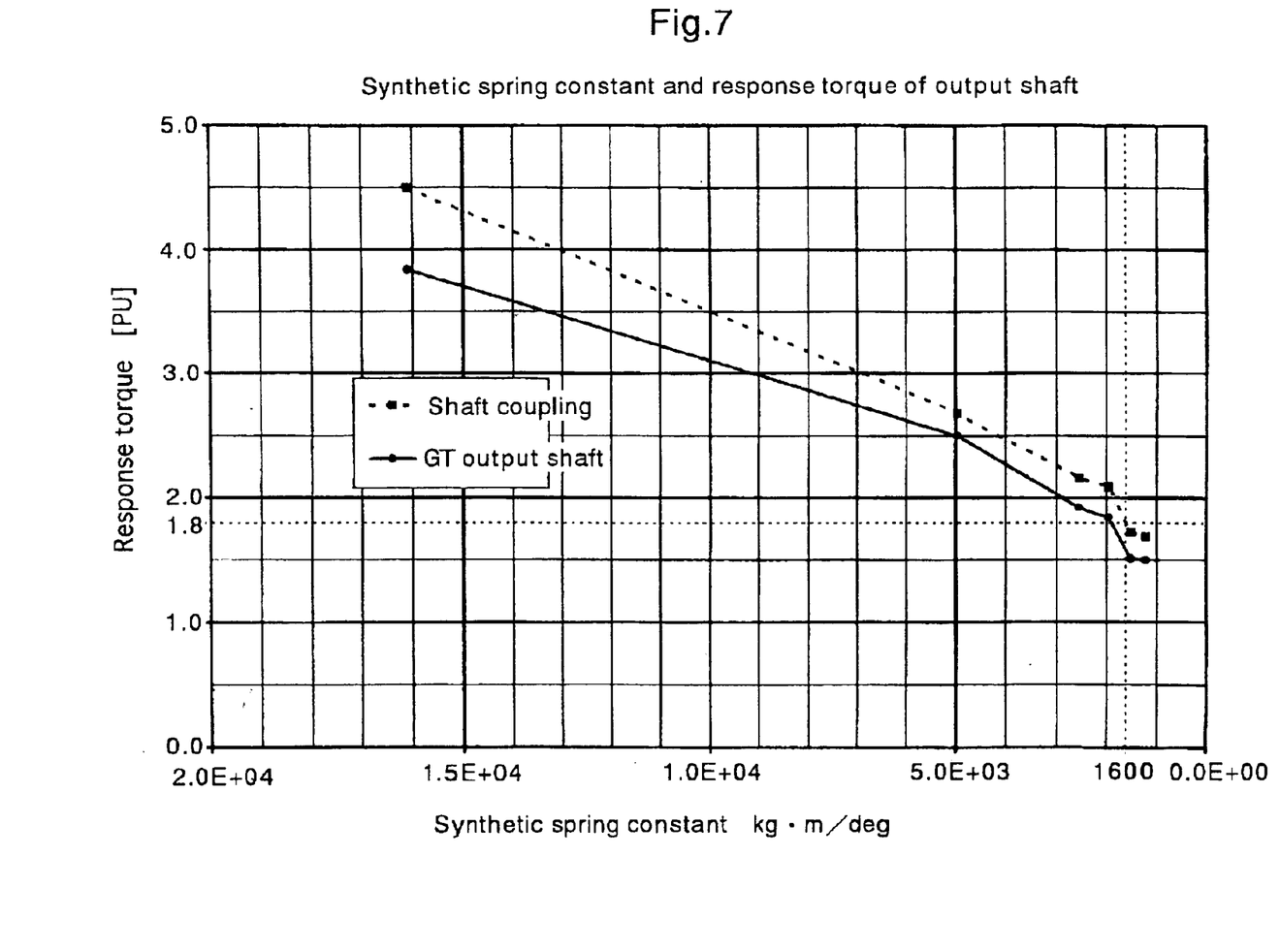
FIG. 7 is a characteristics diagram of elastic deformation means according to an embodiment of the present invention.

FIG. 7 is a characteristics diagram of elastic deformation means according to the present invention. This diagram shows a case in which the voltage drops by 100% because of the momentary voltage drop. Additionally, in this diagram, the abscissa shows a synthetic spring constant of power transmission means (coupling) for connecting the gas turbine 1 to generator 5. Moreover, the ordinate shows a response torque in a ratio to a rated torque of a steady time.

As shown in the drawing, for a maximum torque in a conventional shaft coupling, the shaft coupling indicates about 4.5, and a gas turbine output shaft (GT output shaft) indicates about 3.8. Moreover, from this drawing, it is seen that the synthetic spring constant is reduced (in a rightward direction in the drawing), the response torque can thereby be reduced, the synthetic spring constant (torsion spring constant) is reduced to about 1600 kgf·m/deg (about 15680 N·m/deg), and both response torques of the shaft coupling and GT output shaft can then be set to 1.8 or less.

Figure 8A:
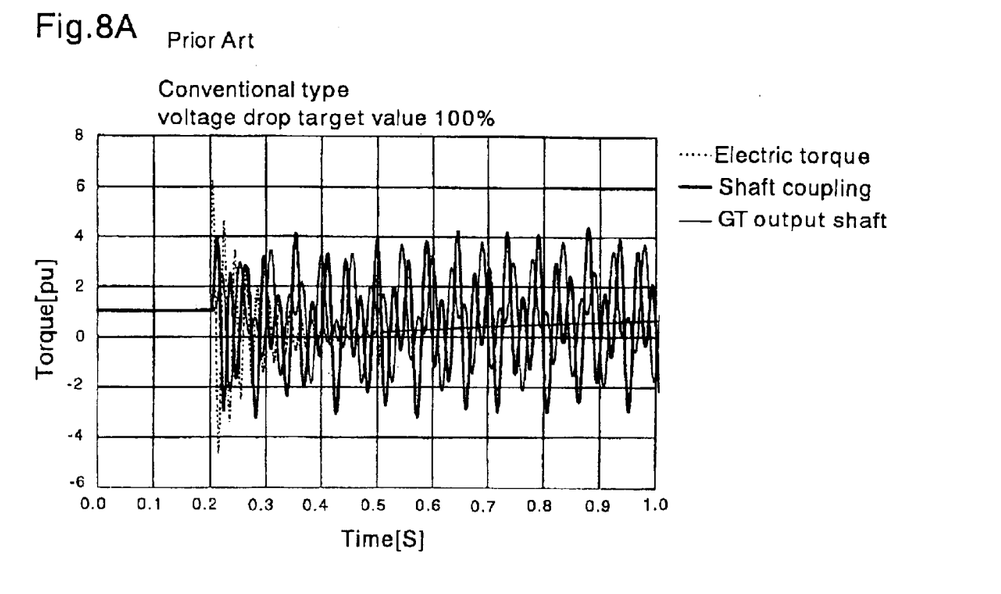
FIGS. 8A and 8B show a simulation result when compared between the embodiment of the present invention and conventional embodiment.
Figure 8B:
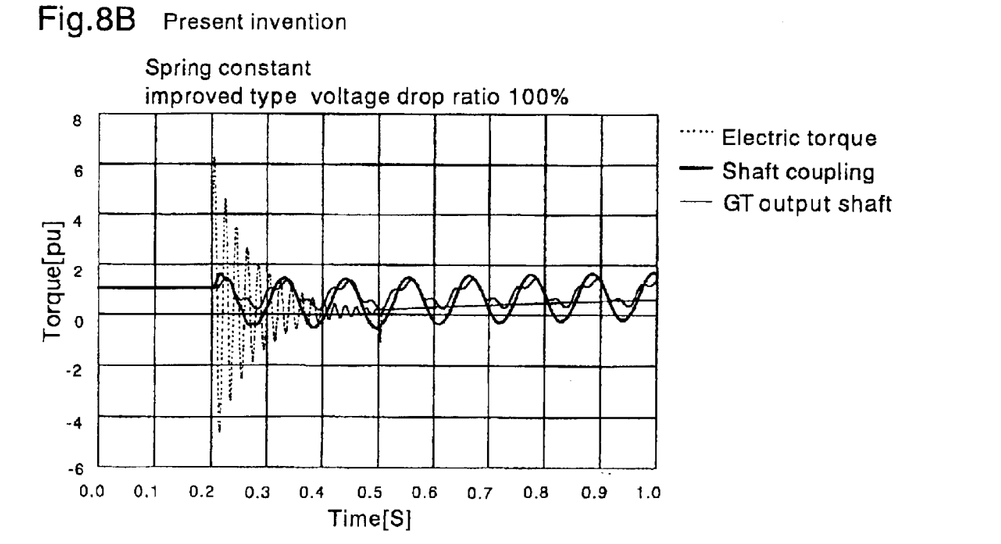

FIG. 8 shows a simulation result according to the embodiment of the present invention, (A) shows the conventional example, and (B) shows the constitution of the present invention shown in FIG. 3 (the case in which the spring constant is about 1600 kgf·m/deg). Moreover, in the drawings, the abscissa indicates time, and the ordinate indicates the torque in a case in which the voltage drops by 100% by the momentary voltage drop. Furthermore, broken lines of the drawings show electric torques of the generator, bold solid lines show the shaft coupling, and fine solid lines show transient response torques of the gas turbine output shaft.

From comparison of FIG. 8, the maximum value of the GT output shaft is about 3.5 or more in the conventional example (A), whereas the value drops to about 1.5 in the example of FIG. 3 of the present invention, and it is seen that the target is sufficiently achieved.

Moreover, it is seen from FIG. 8(A) that a momentary maximum generated torque reaches about six times a usual torque, but the continuation time is remarkably short, the torque vertically fluctuates centering on an average torque in a period of about 20 msec, and the usual torque returns in about 0.5 second. Therefore, the fluctuation torque energy of the excessive electric torque acting for at least about 20 msec is elastically held inside as a strain energy by a torsion deformation of the above-described elastic deformation means 12, the operation of the power generation facility is thereby maintained, and the power supply of an important load can be secured.

As described above, the gas turbine power generation facility of the present invention includes the planetary reduction gear 10 between the motor shaft and the generator shaft, and the elastic deformation means 12 is further disposed on the output side of the planetary reduction gear so that the torsion spring constant is reduced. Thereby, a natural vibration frequency of a motor to generator shaft system which responds to a basic frequency of the excessive torque generated in the generator is set to be below the fundamental frequency of the electric torque, and a distant length is set to be sufficiently large. According to the constitution, even when a relatively large (50 to 100%) momentary voltage drop is generated in the system, it is possible to reduce the transient response torque by the electric torque generated in the generator to be not more than a maximum allowable transmission torque of the motor.

Therefore, even when the excessive electric torque is generated in the generator because of the momentary voltage drop of the system by thunderstorm, and the like, it is possible to maintain the operation of the power generation facility, and secure the power supply of the important load of a factory with the power generation facility installed therein.

That is, for the gas turbine power generation facility of the present invention, when the excessive torque is generated in the generator by the momentary voltage drop, and the like for a short time, it is possible to maintain the operation of the power generation facility, and secure the power supply of the important load, and it is unnecessary to extend an installation length. Even when the torque exceeds the allowable torque of the transmission shaft, the torque can be recovered in a short time without damaging each shaft. Even with the repeated generation of a relatively small momentary voltage drop, a superior effect is obtained that an operation stop is not caused.

Additionally, the present invention has been described by some preferred embodiments, but it would be understood that the scope involved in the present invention is not limited to these embodiments. Conversely, the scope of the present invention includes all improvements, modifications and equivalents included in appended claims.

What is claimed is:

1. A gas turbine power generation facility which rotates/drives a generator with a gas turbine having an output shaft, comprising: a planetary reduction gear between the gas turbine and the generator, wherein:

the planetary reduction gear comprises an elastic deformation means on an output side, a center sun gear connected to be driven by the output shaft of the gas turbine, a plurality of planetary gears disposed to mesh with the center sun gear, and an inner gear disposed to mesh with the planetary gears;

wherein the plurality of planetary gears are rotatably attached to a fixed portion, and;

the inner gear is integrally molded with an inner surface of an outer ring of the planetary reduction gear, wherein the outer ring is positioned coaxially with the output shaft of the gas turbine; and wherein the elastic deformation means has a strain energy within an elastic limit, which is set to be larger than a fluctuation torque energy of the generator of a momentary voltage drop time, wherein the elastic deformation means includes an elastic member elastically connecting an output shaft of the planetary reduction gear to the outer ring, and the elastic member includes a plurality of leaf springs whose inner ends are fixed to the output shaft of the planetary reduction gear, and whose outer ends are connected to the outer ring of the planetary reduction gear, wherein the outer end of each leaf spring is slidable in a length direction and is connected in a peripheral direction so each leaf spring provides a cantilever whose inner end is fixed, wherein each leaf spring is constructed with a relatively thicker inner-end side and a relatively thinner outer-end side.

2. The gas turbine power generation facility according to claim 1, wherein said leaf springs are formed in beams whose bend stresses are substantially equal along lengths thereof and which have an equal strength.

3. The gas turbine power generation facility according to claim 1, further comprising: a hydraulic torque limiter between said output shaft and the generator.

4. A gas turbine power generation facility, comprising:

a generator; operably connected to a gas turbine which rotates/drives the generator, wherein the gas turbine has an output shaft; and a planetary reduction gear disposed between the gas turbine and the generator, the planetary reduction gear comprising:

an elastic member on an output side, the elastic member having a strain energy within an elastic limit, the limit set to be larger than a fluctuation torque energy of the generator of a momentary voltage drop time, a center sun gear connected to be driven by the output shaft of the gas turbine, a plurality of planetary gears rotatably attached to a fixed portion and disposed to mesh with the center sun gear, and an inner gear integrally molded with an inner surface of an outer ring of the planetary reduction gear, wherein the inner gear is disposed to mesh with the planetary gears and the outer ring is positioned coaxially with the output shaft of the gas turbine, and the elastic member includes a plurality of leaf springs whose inner ends are fixed to an output shaft of the planetary reduction gear, and whose outer ends are connected to the outer ring of the planetary reduction gear, wherein the outer end of each leaf spring is slidable in a length direction and is connected in a peripheral direction so each leaf spring provides a cantilever whose inner end is fixed, wherein each leaf spring is constructed with a relatively thicker inner-end side and a relatively thinner outer-end side.

5. The gas turbine power generation facility according to claim 4, wherein said leaf springs are formed in beams having bend stresses substantially equal along lengths thereof and which have an equal strength.

6. The gas turbine power generation facility according to claim 4, further comprising a hydraulic torque limiter between said output shaft and said generator.

7. A gas turbine power generation facility which rotates/drives a generator with a gas turbine, comprising: a planetary reduction gear between the gas turbine and the generator, wherein:

the planetary reduction gear comprises an elastic deformation means on an output side, a center sun gear connected to be driven by an output shaft of the gas turbine, a plurality of planetary gears disposed to mesh with the center sun gear, and an inner gear disposed to mesh with the planetary gears;

wherein the plurality of planetary gears are rotatably attached to a fixed position and the inner gear is integrally molded with an inner surface of an outer ring of the planetary reduction gear, wherein the outer ring is positioned coaxially with the output shaft of the gas turbine; and wherein the elastic deformation means has a strain energy within an elastic limit, which is set to be larger than a fluctuation torque energy of the generator of a momentary voltage drop time, wherein the elastic deformation means includes an elastic member elastically connecting an output shaft of the planetary reduction gear to the outer ring, and the elastic member includes a plurality of leaf springs whose inner ends are fixed to the output shaft of the planetary reduction gear, and whose outer ends are connected to the outer ring of the planetary reduction gear.

8. A gas turbine power generation facility according to claim 7, wherein the outer end of each leaf spring is slidable in a length direction and is connected in a peripheral direction so each leaf spring provides a cantilever whose inner end is fixed, wherein each leaf spring is constructed with a relatively thicker inner-end side and a relatively thinner outer-end side.

* * * * *

UNITED STATES PATENT AND TRADEMARK OFFICE
CERTIFICATE OF CORRECTION

PATENT NO. : 6,846,258 B2  Page 1 of 1
DATED : January 25, 2005
INVENTOR(S) : Yoshiaki Aoki It is certified that error appears in the above-identified patent and that said Letters Patent is hereby corrected as shown below:

<u>Title page,</u>
Insert Item -- [30] Foreign Application Priority Data
January 5, 2001 (JP).........................2001-133788 --.

Signed and Sealed this

Fourteenth Day of February, 2006

JON W. DUDAS
*Director of the United States Patent and Trademark Office*